(12) United States Patent
Huang et al.

(10) Patent No.: US 7,965,512 B2
(45) Date of Patent: Jun. 21, 2011

(54) HEAT-DISSIPATION MODULE AND ELECTRONIC DEVICE USING THE SAME

(75) Inventors: Lung-Chi Huang, Taipei (TW); Kuang-Hua Lin, Taoyuan County (TW); Feng-Lin Hsu, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 125 days.

(21) Appl. No.: 12/453,608

(22) Filed: May 15, 2009

(65) Prior Publication Data
US 2010/0195280 A1  Aug. 5, 2010

(30) Foreign Application Priority Data
Feb. 3, 2009  (TW) .............................. 98201622 U

(51) Int. Cl.
*H05K 7/20* (2006.01)
*F28D 15/00* (2006.01)
(52) U.S. Cl. .................... 361/700; 165/104.33; 361/695
(58) Field of Classification Search .................... 361/700
See application file for complete search history.

(56) References Cited

U.S. PATENT DOCUMENTS

| | | | |
|---|---|---|---|
| 7,325,590 B2* | 2/2008 | Kim et al. ................. | 165/104.33 |
| 7,405,937 B1* | 7/2008 | Wang et al. ................... | 361/700 |
| 7,639,503 B2* | 12/2009 | Tanaka .......................... | 361/719 |
| 2003/0161102 A1* | 8/2003 | Lee et al. ....................... | 361/687 |
| 2004/0105233 A1* | 6/2004 | Lai ................................ | 361/695 |
| 2006/0034055 A1* | 2/2006 | Mok ............................. | 361/700 |
| 2007/0029071 A1* | 2/2007 | Hwang et al. ............. | 165/104.33 |
| 2007/0236886 A1* | 10/2007 | Yang et al. ..................... | 361/700 |
| 2007/0267172 A1* | 11/2007 | Hwang et al. ............... | 165/80.3 |
| 2009/0195982 A1* | 8/2009 | Wu ............................... | 361/695 |

* cited by examiner

*Primary Examiner* — Gregory D Thompson
(74) *Attorney, Agent, or Firm* — Rabin & Berdo, PC

(57) ABSTRACT

A heat-dissipation module and an electronic device including a first heat source and the heat-dissipation module are provided. The heat-dissipation module includes a first heat pipe, a second heat pipe, a first set of heat fins, a second set of heat fins and a fan. One end of the first heat pipe and one end of the second heat pipe are respectively in contact with the first heat source. The first set of heat fins and the second set of heat fins are, respectively, in contact with the other end of the first heat pipe and the other end of the second heat pipe. Heat generated by the first heat source is transferred to the two sets of heat fins through the first and the second heat pipes. The fan is used for providing an air-flow blowing toward the two sets of heat fins to dissipate heat.

18 Claims, 5 Drawing Sheets

HEAT-DISSIPATION MODULE AND ELECTRONIC DEVICE USING THE SAME

RELATED APPLICATIONS

This application claims priority to Taiwan Application Serial Number 98201622, filed on Feb. 3, 2009, which is herein incorporated by reference.

BACKGROUND

1. Field of Invention

The present invention relates to a heat-dissipation module and an electronic device using the same. More particularly, the present invention relates to a heat-dissipation module having more than one heat pipes and an electronic device using the same.

2. Description of Related Art

Along with the development of semiconductor technology, the fabricating process keeps scaling down, the number of transistors per unit area multiplies, and the efficiency of chips progresses rapidly; however, the unit heat generated by chips also increases significantly. Therefore, how to effectively dissipate heat from the internal elements or chips of electronic products has become an important issue, especially in the trend of increasing internal integration, miniaturizing and light-weight of electronic products.

In electronic products like laptop computers or ultra-portable personal computers, the stability and efficiency of system operation is greatly concerned with heat dissipating efficiency. Generally, the major heat sources among numerous internal elements are system core components such as hard disk drive, central processing unit (CPU), north bridge chip, south bridge chip and display chip. Usually, a heat dissipation module is used to take the generated heat away from the above-described heat sources by way of several heat pipes. The heat generated by each chip is conducted away by one corresponding heat pipe and is transferred to a set of corresponding heat fins that contacts with the heat pipe. However, in a circumstance that only the CPU is fully operated and generates a significant amount of heat than other heat sources, the fan of the heat dissipation module is fully operated to take the heat away from the CPU. The air-flow provided by the fan blows toward not only the set of heat fins that needs to be cooled down (namely the set of heat fins related to the CPU) but also the set of heat fins (i.e. related to the other heat sources) that is unnecessary for cooling down. As a result, the efficiency of the fan merely partly applies to where it is really needed; in other words, the efficiency of the fan is unable to be utilized effectively.

On the other hand, there is another design of numerous heat sources respectively contacting with two ends of a single heat pipe in the prior art. However, when one heat source contacting with one end of the heat pipe develops a large amount of heat, the heat will spread to the other heat source contacting with the other end of the heat pipe. Consequently, heat will aggregate in the other heat source, making it overheated. In a worse case, a phenomenon of partial failure of the heat pipe occurs and the heat dissipation efficiency is lowered and further deteriorating the stability of chip operation.

SUMMARY

A heat-dissipation module and an electronic device using the same are provided. Several heat pipes are used for dissipating heat from one heat source. One end of each heat pipe is in contact with the heat source and the other end of each heat pipe individually is in contact with the corresponding set of heat fins.

According to one aspect of the invention, a heat-dissipation module including a first heat pipe, a second heat pipe, a first set of heat fins, a second set of heat fins and a fan is provided. One end of each heat pipe is in contact with a first heat source. The two sets of heat fins are respectively in contact with the other ends of the two heat pipes. Heat generated by the first heat source is transferred to the two sets of heat fins via the two heat pipes respectively. The fan provides an air-flow blowing toward the two sets of heat fins to dissipate heat.

According to another aspect of the invention, an electronic device including a first heat source and a heat-dissipation module is provided. The heat-dissipation module includes a first and a second heat pipe, a first set and a second set of heat fins and a fan. One end of each heat pipe is in contact with the first heat source. The two sets of heat fins are respectively in contact with the other ends of the two heat pipes. Heat generated by the first heat source is transferred to the two sets of heat fins respectively via the two heat pipes. The fan provides an air-flow blowing toward the two sets of heat fins to dissipate heat.

In the present invention, one end of each heat pipe is in contact with one heat source, and heat generated by the heat source is transferred to different sets of heat fins via several heat pipes, so as to dissipate heat. By forming a continuous heat-exchange cycle between the two ends of each heat pipe, the heat-dissipation efficiency is increased, the heat-exchange capability is improved, and the efficiency of the fan is fully utilized. Moreover, the phenomenon of partial failure of the heat pipe is prevented and the operation stability of the heat source is assured.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
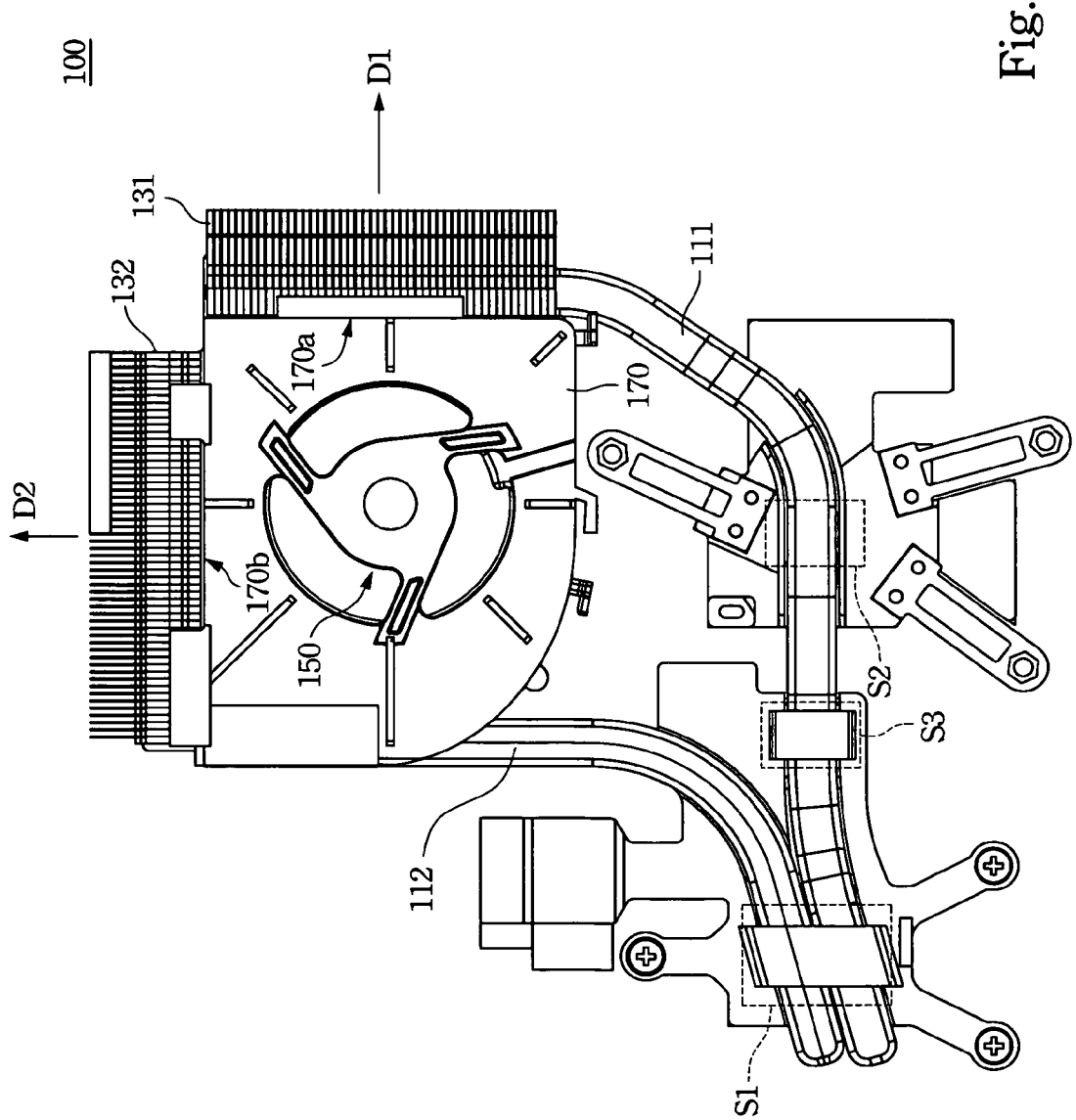
FIG. 1A is a front-side view of a heat-dissipation module according to one embodiment of the invention.

Reference will now be made in detail to the present embodiments of the invention, examples of which are illustrated in the accompanying drawings.

In the present embodiment of the invention, more than one heat pipes are used to dissipate heat from one heat source. A continuous heat-exchange cycle is formed between two ends of each heat pipe, and therefore the issue of heat aggregation at the heat source causing partial failure of the heat pipe can be prevented. In addition, single heat pipe can be further in contact with more than one heat sources to increase heat-dissipation efficiency and capability of the heat-dissipation module. Please refer to FIG. 1A and FIG. 1B at the same time. The two figures respectively illustrate a front-side view and a back-side view of a heat-dissipation module according to one embodiment of the invention.

The heat-dissipation module 100 mainly includes a first heat pipe 111, a second heat pipe 112, a first set of heat fins 131, a second set of heat fins 132 and a fan 150. One end of the first heat pipe 111 and one end of the second heat pipe 112 are both in contact with a first heat source S1. The first set of heat fins 131 is in contact with the other end of the first heat pipe 111. The second set of heat fins 132 is in contact with the other end of the second heat pipe 112. The heat generated by the first heat source S1 are transferred to the first set of fins 131 and the second set of heat fins 132 via the first heat pipe 111 and the second heat pipe 112 respectively. The fan 150 is used for providing an air-flow blowing toward the first set of heat fins 131 and the second set of heat fins 132, so as to dissipate heat away from the first and the second set of heat fins 131 and 132.

The air-flow provided by the fan 150 blows toward the first set of heat fins 131 and the second set of heat fins 132 simultaneously, so as to dissipate heat from the first and the second set of heat fins 131 and 132 at the same time. Because the heat is dissipated away from the first heat source S1 by way of the first and the second set of heat fins 131 and 132 at the same time, the utilization efficiency of the fan 150 is enhanced and the heat-dissipation efficiency for the first heat source S1 is increased.

Figure 1B:
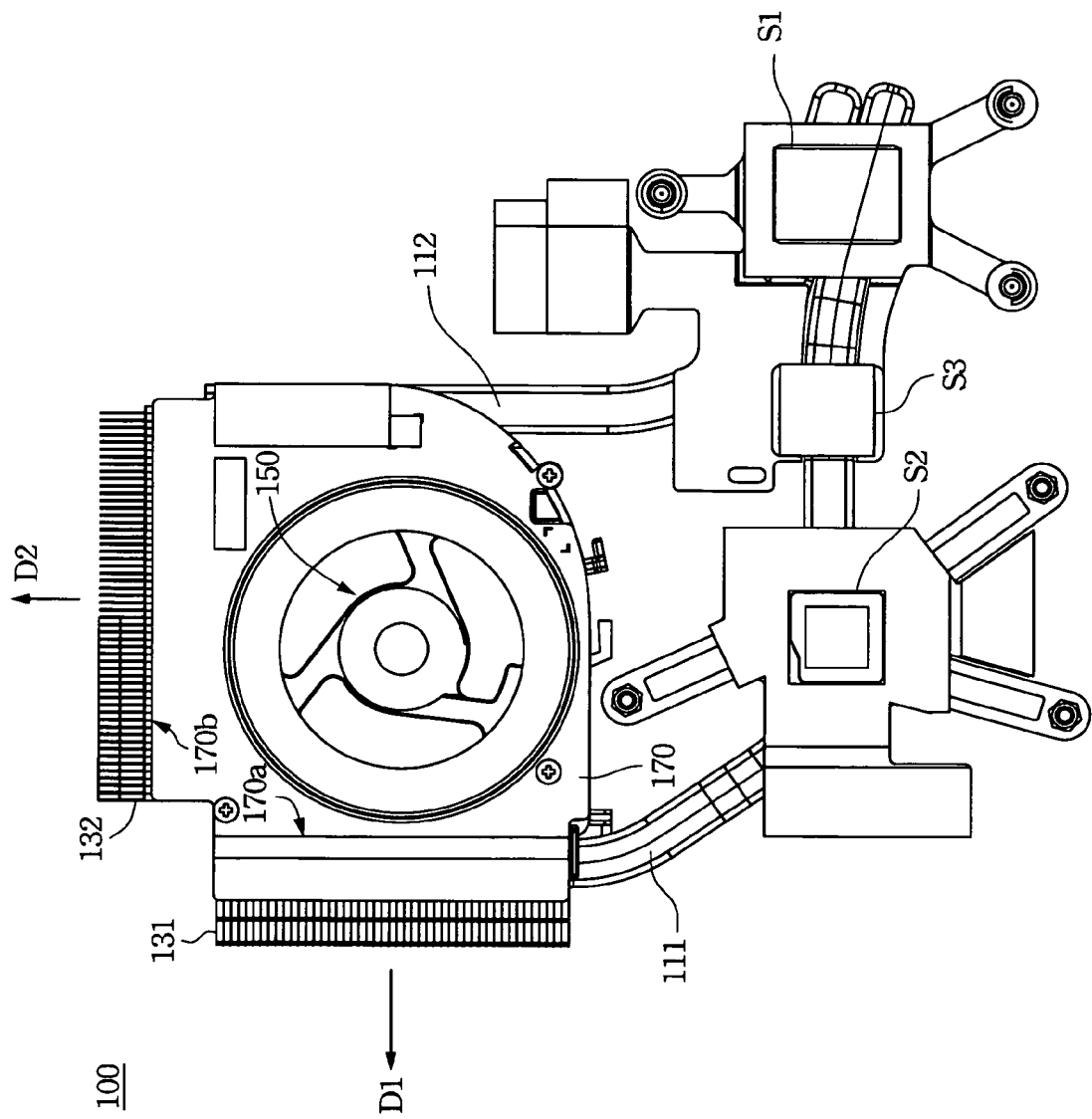
FIG. 1B is a back-side view of the heat-dissipation module according to one embodiment of the invention.
Figure 4:
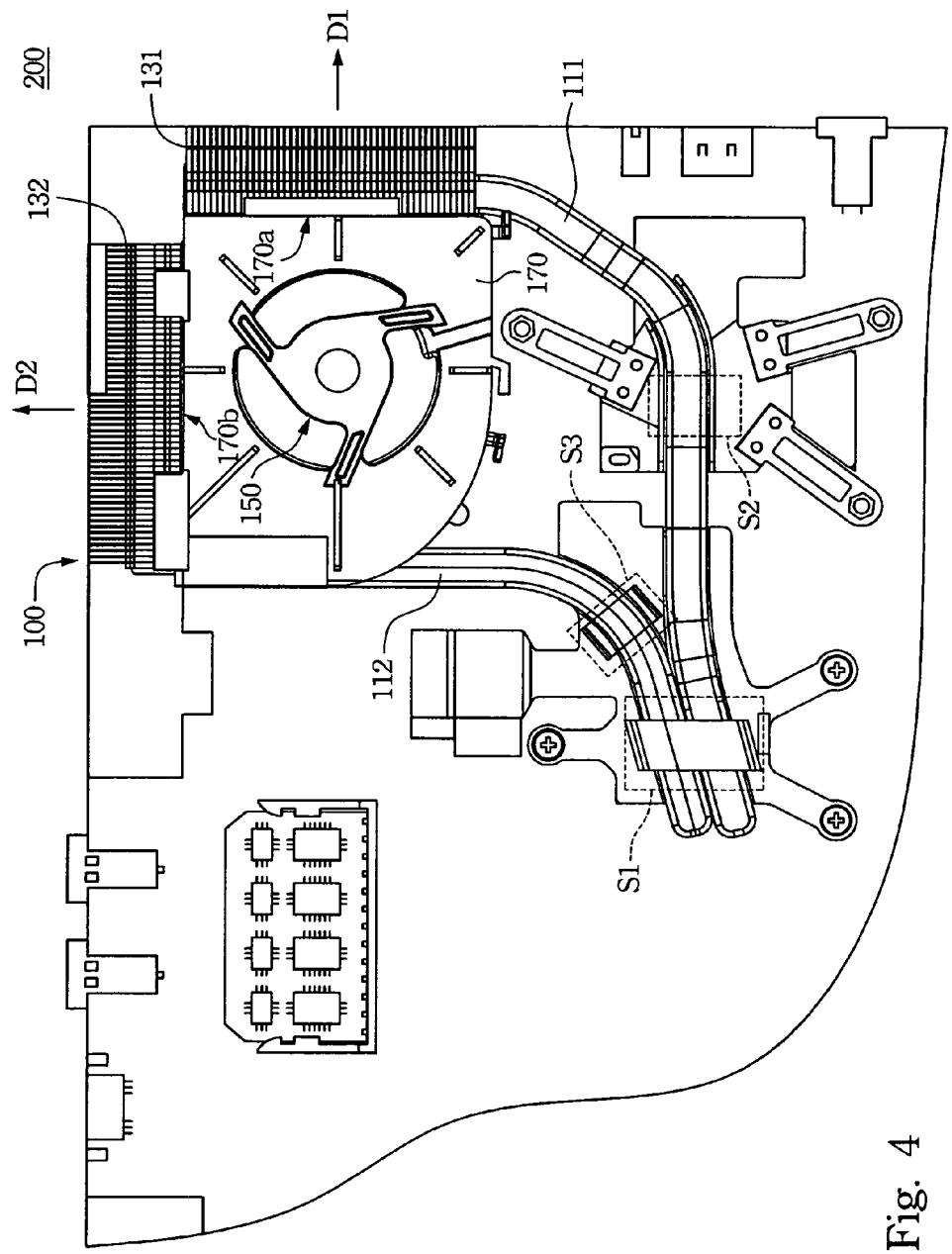
FIG. 4 illustrates a heat-dissipation module according to one embodiment of the invention.

The heat-dissipation module 100 can also be used to cool more than one heat source when the first heat pipe 111 and/or the second heat pipe 112 is further in contact with other heat sources. For example, the heat-dissipation module 100 can be further used to dissipate heat from a second heat source S2. Either one of the two heat pipes 111 or 112 can be used to dissipate heat from the second heat source S2. The first heat pipe 111 is taken as example in the present embodiment. The second heat source S2 is in contact with the first heat pipe 111 between two ends thereof, as shown in FIG. 1A. In addition to that, the heat-dissipation module 100 can be further used to cool a third heat source S3. Similarly, either one of the two heat pipes 111 or 112 can be used to dissipate heat from the third heat source S3. FIG. 4 illustrates that the second heat pipe 112 is in contact with the third heat source S3, and the third heat source S3 is in contact with the second heat pipe 112 between two ends of the second heat pipe 112. Exemplarily, the first heat pipe 111 is in contact with both the second heat source S2 and the third heat source S3 in the present embodiment. The second heat source S2 and the third heat source S3 are individually in contact with the first heat pipe 111 between the two ends thereof, as shown in FIG. 1A.

Although the present embodiment is elaborated in a way that the second heat source S2 and the third heat source S3 are in contact with the first heat pipe 111, the number of heat sources and the manner of contacting the heat sources are not limited thereto. For example, the second heat source S2 and the third heat source S3 can be respectively in contact with the first heat pipe 111 and the second heat pipe 112, so as to transfer heat to the first set of heat fins 131 and the second set of heat fins 132 respectively via the first heat pipe 111 and the second heat pipe 112. In another example, the heat-dissipation module 100 of the present embodiment can be further used to cool more than four heat sources.

Figure 2:
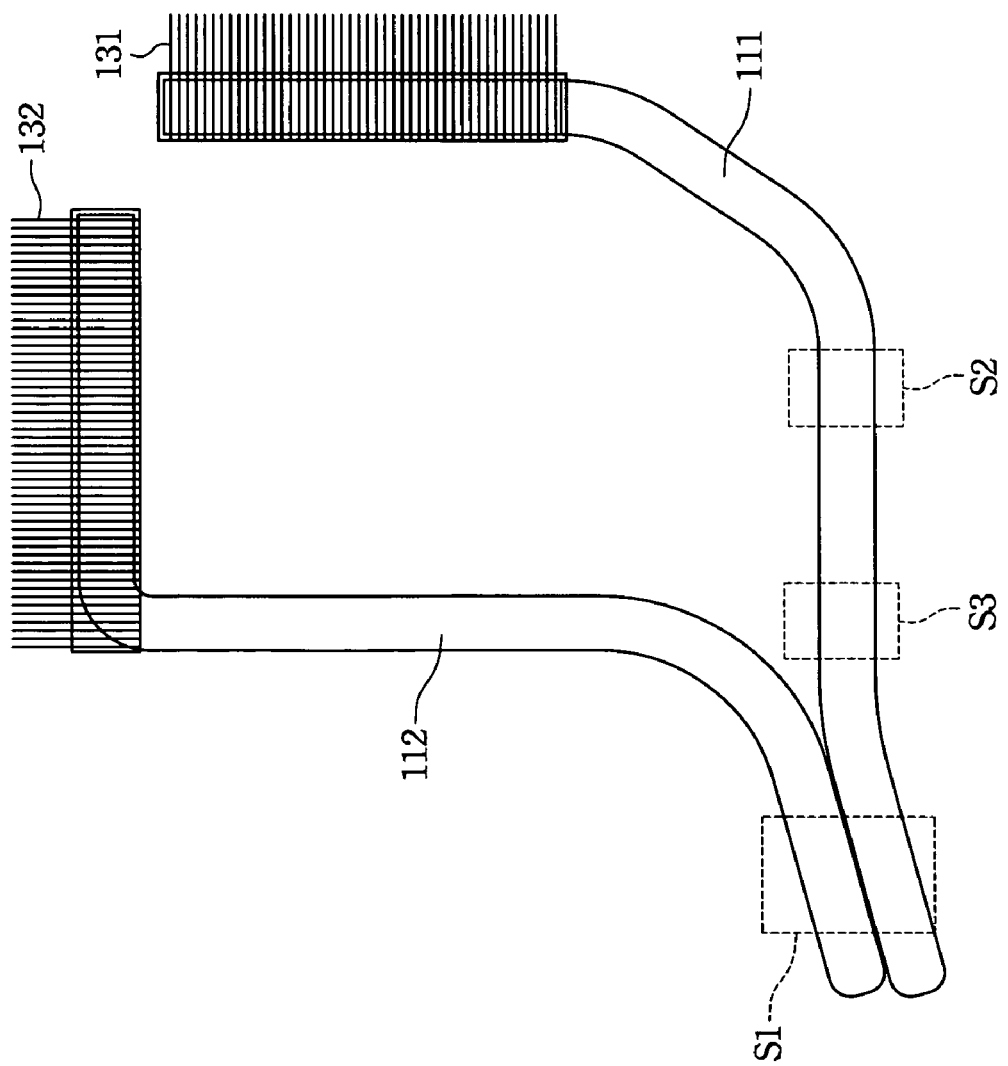
FIG. 2 illustrates the first heat pipe, the second heat pipe, the first set of heat fins and the second set of heat fins in FIG. 1A.

On the other hand, the first heat pipe 111 and the second heat pipe 112 of the present embodiment approximately form a Y-shaped structure. Please refer to FIG. 2, the first heat pipe 111, the second heat pipe 112, the first set of heat fins 131 and the second set of heat fins 132 are illustrated. The end of the first heat pipe 111 being in contact with the first heat source S1 is adjacent to the end of the second heat pipe 112 being in contact with the first heat source S1. The other ends of the first and the second heat pipe 111 and 112 are respectively in contact with the first set of heat fins 131 and the second set of heat fins 132. The first heat pipe 111 and the second heat pipe 112 individually have a work fluid for transferring heat. The first heat pipe 111 and the second heat pipe 112 are airtight tubes and individually have an internal pressure lower than 1 atm. Besides that, the inner wall of the first heat pipe 111 and the inner wall of the second heat pipe 112 individually have a micro-pore structure for providing capillarity to the work fluid.

Practically, the work fluid can be water, and the inner space of each heat pipe 111 or 112 is air-extracted to a close-to-vacuum state. When the heat generated by these heat sources S1, S2 and S3 is transferred to the two heat pipes 111 and 112, the heat cause the work fluid being vaporized into steam, and a vapor pressure is generated thereafter. Then the steam spreads toward the other end of the first heat pipe 111 and the other end of the second heat pipe 112 being respectively in contact with the two sets of heat fins 131 and 132, because the pressure there is relatively low. Next, the steam is cooled down by transferring the heat to the two sets of heat fins 131 and 132, which causes the cooled steam being condensed into the work fluid. The condensed work fluid is transferred back to where the heat pipes 111 and 112 contact with the heat sources S1, S2 and S3 through the driving of the capillary. Therefore, the heat generated by any one of the heat sources S1, S2 and S3 can be dissipated away by the first set of heat fins 131 and the second set of heat fins 132.

The heat-dissipation module 100 further includes a housing 170, as shown in FIG. 1A. The housing 170 has two outlets 170a and 170b. The fan 150 is disposed inside the housing 170, and the air-flow provided by the fan 150 blows out of the heat-dissipation module 100 through the two outlets 170a and 170b. More specifically, the air-flow blows out of the heat-dissipation module 100 through the two outlets 170a and 170b in two directions D1 and D2. In the heat-dissipation module 100 of the present embodiment, the two sets of heat fins 131 and 132 are respectively disposed at the two outlets 170a and 170b, and the two directions D1 and D2 are approximately perpendicular to each other. In the present embodiment, the fan 150 is exemplified by a centrifugal fan with a rotary blade, that the air enters the fan 150 in the axial direction of the rotary blade and exits the fan 150 along the radial direction of the rotary blade.

The heat-dissipation module 100 of the present embodiment can be adopted in an electronic device. Please refer to FIG. 3, an electronic device according to one embodiment of the invention is shown. The electronic device 200 at least includes a first heat source S1 and the heat-dissipation module 100. The heat-dissipation module 100 mainly includes a first heat pipe 111, a second heat pipe 112, a first set of heat fins 131, and a second set of heat fins 132. One end of the first heat pipe 111 and one end of the second heat pipe 112 are in contact with the first heat source S1. The first set of heat fins 131 is in contact with the other end of the first heat pipe 111, and the second set of heat fins 132 is in contact with the other end of the second heat pipe 112.

Practically, the electronic device 200 can be a laptop computer and further includes the second heat source S2 and the third heat source S3. In one example, the second and the third heat sources S2 and S3 contact the first heat pipe 111 between the two ends thereof. The first heat source S1, the second heat source S2 and the third heat source S3 are respectively north bridge chip, graphics chip and central processing unit for instance; nevertheless, the heat sources in the electronic device 200 that can be subjected to dissipating heat by the heat-dissipation module 100 are not limited thereto. Any other elements that generate heat, or have the requirement for heat dissipation, can all be cooled down by the heat-dissipation module 100 of the present embodiment.

Figure 3:
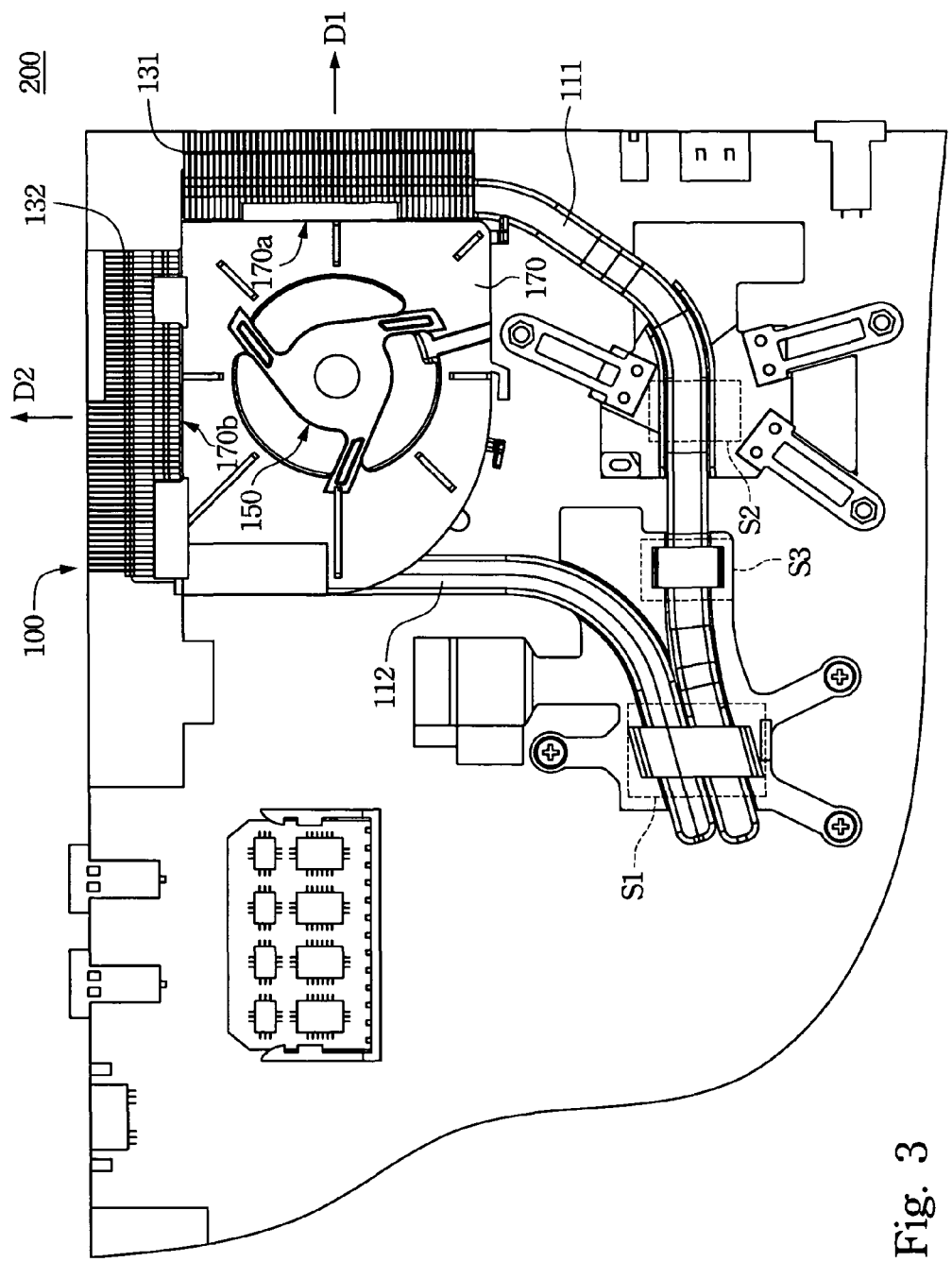
FIG. 3 illustrates an electronic device according to one embodiment of this invention.

As shown in FIG. 3, in the electronic device 200, the first heat source S1 is cooled by the first and the second heat pipe 111 and 112 simultaneously, so the heat-dissipation capability of the heat-dissipation module 100 for the first heat source S1 is improved and the operation performance of heat source S1 as well. Practically, a heat source that requires higher power consumption for operation can be selected as the first heat source S1. That is to say, among these heat sources S1, S2 and S3, the heat generated by the first heat source S1 per unit time is greater than that by the second or the third heat source S2 or S3 per unit time, therefore increasing the design flexibility.

In the heat-dissipation module 100 of the present embodiment, said two ends of the first heat pipe 111 being in contact with the first heat source S1 and the first set of heat fins 131 can be respectively regarded as an evaporation section and a condensation section of the first heat pipe 111; and said two ends of the second heat pipe 112 being in contact with the first heat source S1 and the second set of heat fins 132 can be respectively regarded as an evaporation section and a condensation section of the second heat pipe 112. A stable and continuous phase change cycle of the work fluid is formed between the evaporation and the condensation section of the first heat pipe 111, as well as between the two sections of the second heat pipe 112, making the heat being steadily transferred from the evaporation section to the condensation section, and thus the issue of partial failure of heat pipes 111 and 112 can be prevented.

In the heat-dissipation module and the electronic device using the same of above-described embodiments of the present invention, the heat from the first heat source is transferred by the first and the second heat pipe at the same time, so the heat-dissipation efficiency is increased and the utilization efficiency of the fan is enhanced. Further, by using the first or the second heat pipe to cool numerous heat sources, the heat-dissipation capability of the module is improved, and the cost for heat pipes with higher specification (heat-dissipation capability) can be saved. Moreover, a stable and continuous heat-exchange cycle within each heat pipe is formed, the issue of partial failure of heat pipes can therefore be prevented, and the product quality can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A heat-dissipation module, comprising:
    a first heat pipe having one end in contact with a first heat source;
    a second heat pipe having one end in contact with the first heat source, wherein said end of the first heat pipe being in contact with the first heat source is adjacent to said end of the second heat pipe being in contact with the first heat source so that the first heat pipe and the second heat pipe approximately form a Y-shaped structure;
    a first set of heat fins and a second set of heat fins being respectively in contact with the other end of the first heat pipe and the other end of the second heat pipe, wherein heat generated from the first heat source is transferred to the first set of heat fins and the second set of heat fins via the first heat pipe and the second heat pipe respectively; and
    a fan arranged between the first heat pipe and the second heat pipe, for providing an air-flow blowing toward the first set of heat fins and the second set of heat fins to dissipate the heat.

2. The heat-dissipation module of claim 1, wherein the first heat pipe is further in contact with a second heat source, and the second heat source is in contact with the first heat pipe between said two ends of the first heat pipe.

3. The heat-dissipation module of claim 2, wherein the first heat pipe is further in contact with a third heat source, and the third heat source is in contact with the first heat pipe between said two ends of the first heat pipe.

4. The heat-dissipation module of claim 2, wherein the second heat pipe is further in contact with a third heat source, and the third heat source is in contact with the second heat pipe between said two ends of the second heat pipe.

5. The heat-dissipation module of claim 1, wherein the first heat pipe and the second heat pipe individually have a work fluid, and the heat generated by the first heat source is respectively transferred to said end of the first heat pipe being in contact with the first set of heat fins and said end of the second heat pipe being in contact with the second set of heat fins through the work fluid.

6. The heat-dissipation module of claim 5, wherein the inner wall of the first heat pipe and the inner wall of the second heat pipe individually have a micro-pore structure for providing a capillarity to the work fluid.

7. The heat-dissipation module of claim 6, wherein the work fluid is water.

8. The heat-dissipation module of claim 1, wherein the first heat pipe and the second heat pipe are airtight tubes and individually have an internal pressure lower than 1 atm.

9. The heat-dissipation module of claim 1, further comprising:
    a housing in which the fan is disposed, wherein the housing has two outlets, and the air-flow blows out of the heat-dissipation module through the two outlets.

10. The heat-dissipation module of claim 9, wherein the air-flow blows out of the heat-dissipation module through the two outlets in two directions, and the two directions are approximately perpendicular to each other.

11. The heat-dissipation module of claim 9, wherein the first set of heat fins and the second set of heat fins are respectively disposed at the two outlets.

12. An electronic device, comprising:
    a first heat source; and
    a heat-dissipation module, comprising:
        a first heat pipe and a second heat pipe each having one end in contact with the first heat source, wherein said end of the first heat pipe being in contact with the first heat source is adjacent to said end of the second heat pipe being in contact with the first heat source so that the first heat pipe and the second heat pipe approximately form a Y-shaped structure;
        a first set of heat fins and a second set of heat fins being respectively in contact with the other end of the first heat pipe and the other end of the second heat pipe, wherein heat generated by the first heat source is transferred to the first set of heat fins and the second set of heat fins respectively via the first heat pipe and the second heat pipe; and a fan arranged between the first heat pipe and the second heat pipe for providing an air-flow blowing toward the first set of heat fins and the second set of heat fins to dissipate the heat.

13. The electronic device of claim 12, further comprising: a second heat source being in contact with the first heat pipe between said two ends of the first heat pipe.

14. The electronic device of claim 13, wherein the heat generated by the first heat source per unit time is greater than heat generated by the second heat source per unit time.

15. The electronic device of claim 13, further comprising: a third heat source being in contact with the first heat pipe between said two ends of the first heat pipe.

16. The electronic device of claim 15, wherein the heat generated by the first heat source per unit time is greater than heat generated by the second or the third heat source per unit time.

17. The electronic device of claim 15, further comprising: a third heat source being in contact with the second heat pipe between said two ends of the second heat pipe.

18. The electronic device of claim 12, wherein the electronic device is a notebook computer.

* * * * *